May 1, 1945.  V. H. PALISANO ET AL  2,374,697

TAIL GATE

Filed March 11, 1944

Inventor
VINCENT H. PALISANO AND SIGMUND MENTECKI
by
Beau, Brooks, Buckley & Beau.
Attorneys Patented May 1, 1945

2,374,697

UNITED STATES PATENT OFFICE 2,374,697

TAIL GATE

Vincent H. Palisano and Sigmund Mentecki, Buffalo, N. Y., assignors to Charles J. Palisano, Victor J. Palisano, Joseph S. Palisano, Samuel J. Palisano, and Vincent H. Palisano, copartners doing business as Motor Service & Supply Co., New York, N. Y.

Application March 11, 1944, Serial No. 526,042

4 Claims. (Cl. 296—50)

This invention relates to closure means for vehicles and particularly to an improved tail gate for vehicles generally used for hauling goods.

Conventional tail gates comprise merely panels hinged along their lower edges to the rear bolsters of vehicle bodies, whereby they may be opened by rearward lowering pivotal movement. Such tail gates are notoriously inadequate in that they are subject to frequent damage as a result of backing into obstructions and otherwise. A further objection to conventional tail gates resides in the inability to open them under certain circumstances, as when a loading dock or platform is higher than the floor of the vehicle body.

In spite of the generally recognized shortcomings of conventional tail gates the many alternatives concerned and suggested have not produced a satisfactory practical substitute. The tail gate of the present invention affords means whereby an element or elements thereof may be selectively moved either upwardly in the plane of the vehicle opening or pivotally inwardly or outwardly, depending on various conditions, such as the height of the loading dock or platform, the disposition of goods just inside the vehicle opening, and the disposition of goods or other obstructions on the loading dock or platform adjacent the vehicle.

Further the element or elements of the tail gate of the present invention may be given a compound movement of any desired pattern within the limits of the several pivotal connections provided for supporting the element or elements.

In the form illustrated here by way of example the tail gate has a pair of companion panels, one secured to each side of the rear opening of a commercial vehicle by a vertical hinge so that it may be moved pivotally inwardly or outwardly. Each panel is further provided with a pivotal support adjacent to its upper edge and also adjacent to the vertical hinge. Such second pivot has an axis extending longitudinally of the vehicle whereby each of the pair of tail gate panels may be swung upwardly and toward the side of the vehicle upon which it is supported. In this way the tail gate panels may be moved out of the way to permit unloading even though the loading dock or platform be somewhat higher than the floor of the vehicle and, further, the tail gate may be moved upwardly out of the way prior to backing the vehicle up to a loading dock or platform without danger of damaging the tail gate during maneuvering of the vehicle.

While a single complete and specific embodiment of the present invention is shown in the drawing and described in detail in the following specification by way of example, it is to be understood that the principles of the invention are not limited in their application, otherwise than as defined in the appended claims.

Figure 1:
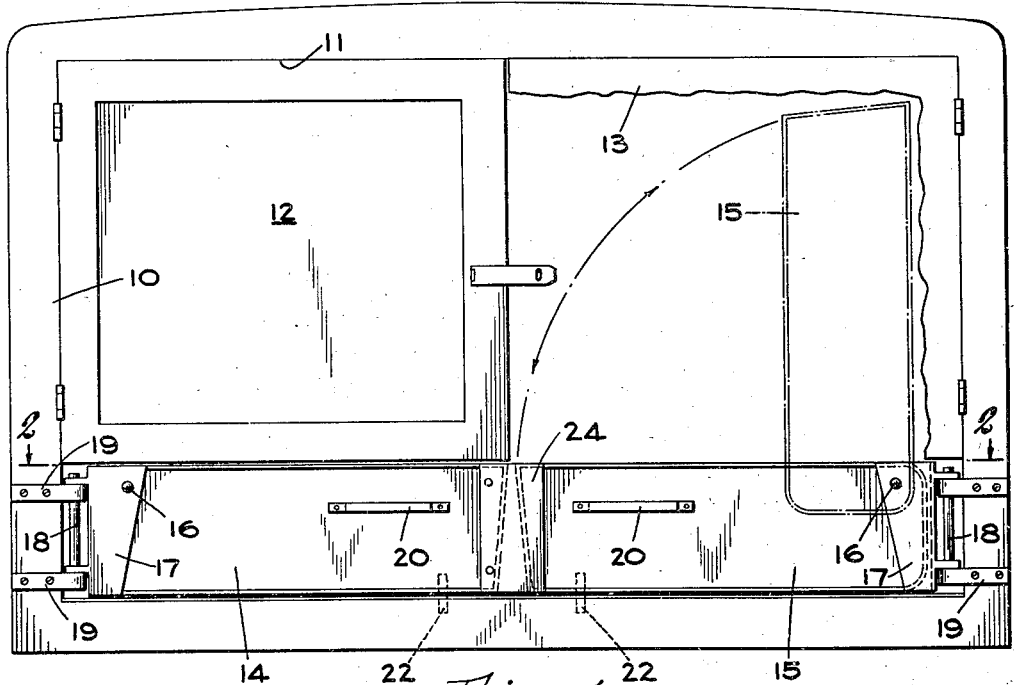
Figure 1 is a rear elevational view of a truck, trailer, or other vehicle having a preferred form of the tail gate of the present invention mounted thereon.
Figure 2:
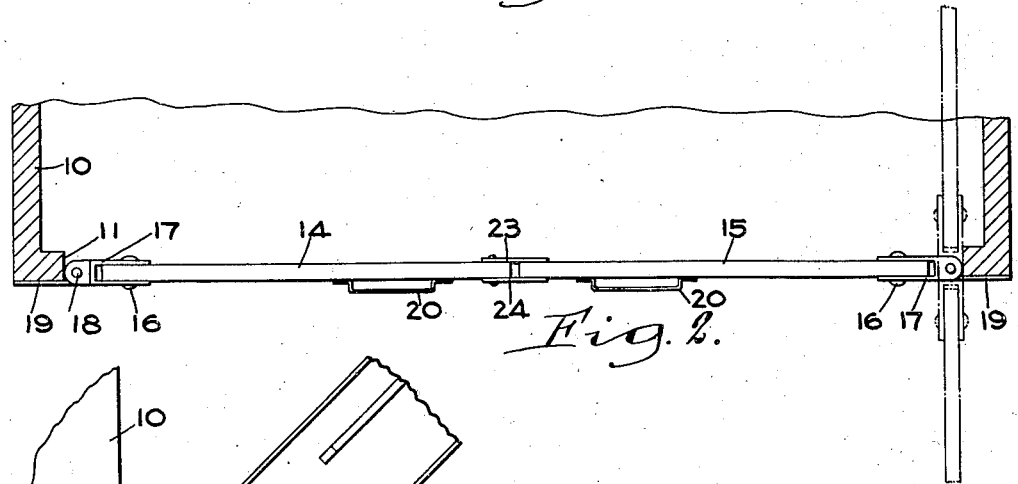
Figure 2 is a fragmentary cross sectional view taken on the line 2—2 of Figure 1.
Figure 3:
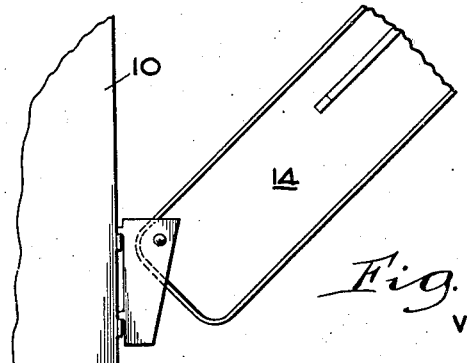
Figure 3 is a fragmentary side elevational view of the rear portion of the vehicle of Figure 1 with a tail gate panel thereof swung partially upwardly and outwardly.

Throughout the drawing like characters of reference denote like parts and the numeral 10 designates a vehicle body having a rear opening 11. In the illustrated instance the upper portion of the rear opening 11 is provided with a pair of conventional hinged doors 12 and 13 but it is to be understood that the presence or absence of such doors is immaterial to the present invention.

The tail gate itself comprises a pair of panels 14 and 15. Each of the panels 14 and 15 has pivotal connection as at 16 with a U-shaped bracket 17, the bracket 17 being in turn hinged to the vehicle body 10, by hinge pins 18 and hinge brackets 19.

Manipulating handles for the panels 14 and 15 are shown at 20 and when in the lowered full line position of Figure 1 the panels are held against inward or outward movement by pins 22 which may be carried directly by the panels and enter recesses formed in the vehicle body floor or the rear bolster.

To permit free upward pivoting movement of the panels their adjacent edges are downwardly tapered as shown in Figure 1 and to close the gap so formed and also to further interlock the panels when they are in closed position, the panel 14 has a pair of inner and outer plates 23 and 24, fixed thereto in any desired manner, as by means of rivets, screws or otherwise. The plates 23 and 24 project from the panel 14 in such manner as to embrace and receive the adjacent meeting edge of panel 15.

Obviously, where doors like the doors 12 and 13 are employed it is possible to move the panels directly upward only by opening the doors. It is preferable to arrange the panels so that they may retain the upright dot and dash line position of Fig. 1 and this may be accomplished by merely arranging the pivot 16 with sufficient inherent friction or by providing any other desired yieldable or positive detent means.

What is claimed is:

1. Vehicular construction comprising a body having a rear opening, tail gate means for closing the lower part of said opening, said means comprising a pair of closure elements, means supporting said elements for independent pivotal movement about vertical axes disposed adjacent opposite sides of said opening, and means independently pivoting each of said elements about axes extending longitudinally of the body and disposed adjacent the sides of said opening, said second pivot axis being disposed adjacent the upper edges of said closure elements.

2. Vehicular construction comprising a body having a substantially vertical wall and an opening therein, means for closing the lower part of said opening, said means comprising a closure element, means supporting said element for independent pivotal movement about a vertical axis disposed adjacent one side of said opening, and means independently pivoting said element about an axis extending longitudinally of the body and disposed adjacent the first pivotal supporting means, said second pivot axis being disposed adjacent the upper edge of said closure element.

3. Vehicular construction comprising a body having a rear opening, tail gate means for closing the lower part of said opening, said means comprising a pair of closure elements, means supporting said elements for independent pivotal movement about vertical axes disposed adjacent opposite sides of said opening, and means independently pivoting each of said elements about axes extending longitudinally of the body and likewise disposed adjacent the sides of said opening, said second pivot axis being disposed adjacent the upper edges of said closure elements, said closure elements having their central abutting portions formed to interfit when in closed position.

4. Vehicular construction comprising a body having a rear opening, tail gate means for closing the lower part of said opening, said means comprising a pair of closure elements, means supporting said elements for independent pivotal movement about vertical axes disposed adjacent opposite sides of said opening, and means independently pivoting each of said elements about axes extending longitudinally of the body and likewise disposed adjacent the sides of said opening, said closure elements having their central abutting portions formed to interfit when in closed position, said second pivot axis being disposed adjacent the upper edges of said closure elements.

VINCENT H. PALISANO.
SIGMUND MENTECKI.